US012784268B2

(12) United States Patent
Hong et al.

(10) Patent No.: US 12,784,268 B2
(45) Date of Patent: Nov. 3, 2026

(54) LOCALIZATION METHOD AND APPARATUS USING LINE CLOUD MAP DATA, LINE CLOUD MAP DATA GENERATION METHOD

(71) Applicant: Industry-University Cooperation Foundation Hanyang University, Seoul (KR)

(72) Inventors: Je Hyeong Hong, Seoul (KR); Chunghwan Lee, Yongin-si (KR); Chanhyuk Yun, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 344 days.

(21) Appl. No.: 18/417,235

(22) Filed: Jan. 19, 2024

(65) Prior Publication Data

US 2024/0249434 A1 Jul. 25, 2024

(30) Foreign Application Priority Data

Jan. 20, 2023 (KR) ........................ 10-2023-0008666

(51) Int. Cl.

| | |
|---|---|
| ***G06T 7/73*** | (2017.01) |
| ***G06F 16/55*** | (2019.01) |
| ***G06F 16/587*** | (2019.01) |
| ***G06F 21/62*** | (2013.01) |

(52) U.S. Cl.

CPC ................ *G06T 7/74* (2017.01); *G06F 16/55* (2019.01); *G06F 16/587* (2019.01); *G06F 21/6227* (2013.01); *G06T 2207/10024* (2013.01); *G06T 2207/10028* (2013.01)

(58) Field of Classification Search

CPC ................ G06T 7/74; G06T 7/70; G06T 7/30

See application file for complete search history.

(56) References Cited

U.S. PATENT DOCUMENTS

| | | | | |
|---|---|---|---|---|
| 2020/0005486 A1* | 1/2020 | Sinha | ...................... | G06T 7/337 |
| 2020/0126256 A1* | 4/2020 | Sinha | ...................... | G06T 17/10 |

OTHER PUBLICATIONS

Kunal Chelani et al., "How Privacy-Preserving are Line Clouds? Recovering Scene Details from 3D Lines", arXiv, 2021 (20 pages).

Pablo Speciale et al., "Privacy Preserving Image-Based Localization", CVPR, 2019, pp. 5493-5503.

* cited by examiner

*Primary Examiner* — Molly Wilburn

(74) *Attorney, Agent, or Firm* — Sughrue Mion, PLLC

(57) ABSTRACT

Disclosed are a method for generating line cloud map data that can ensure privacy and a location estimation method and apparatus using the line cloud map data that can ensure privacy. The disclosed location estimation method using line cloud map data comprises: detecting keypoints in a query image; and estimating a location where the query image was generated by mapping the keypoints of the query image and lines in line cloud map data, wherein the line cloud map data comprise first feature information on lines determined by keypoint pairs selected from keypoints included in point cloud map data, and second feature information on the keypoint pairs matched to the determined lines.

14 Claims, 7 Drawing Sheets

[FIG. 1]
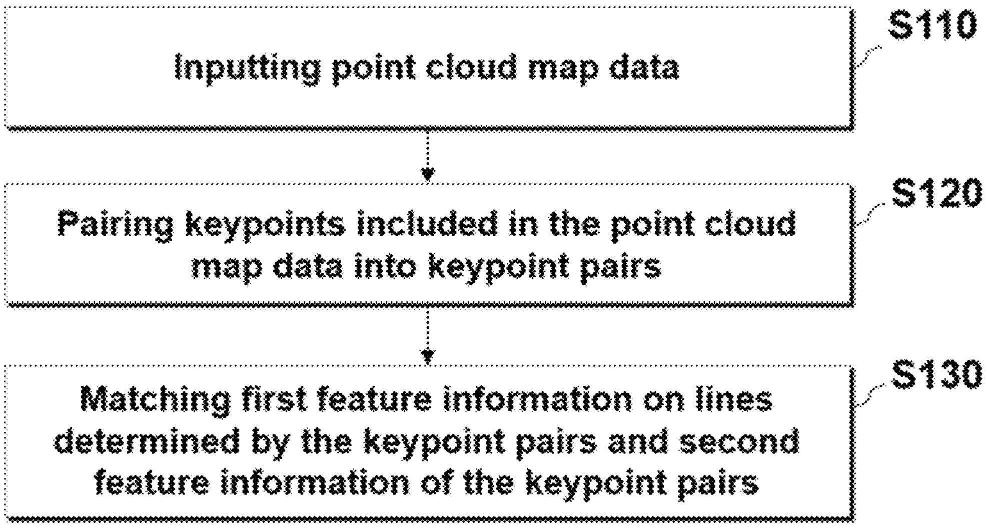

[FIG. 2]
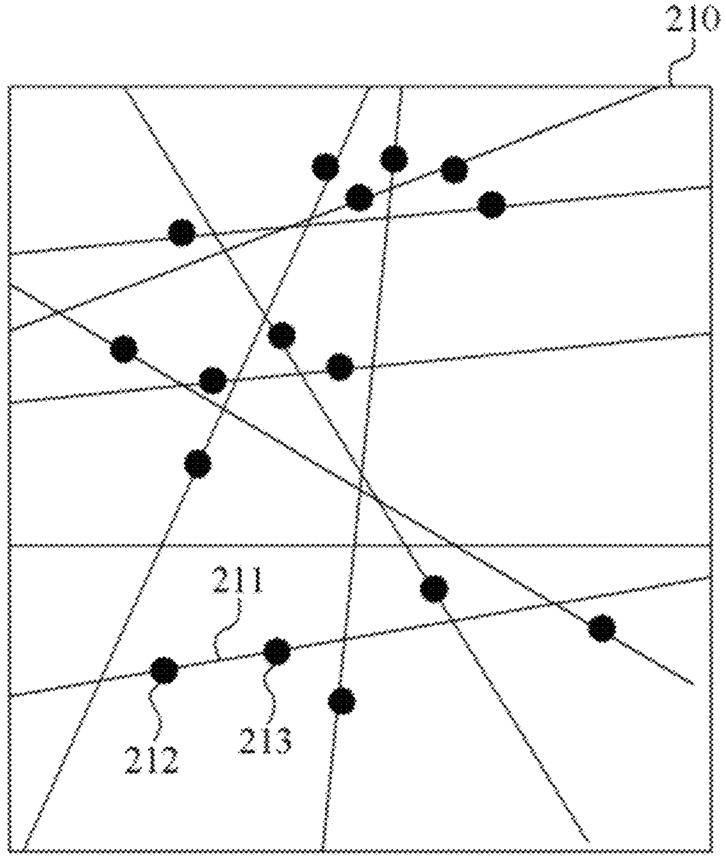

[FIG. 3]
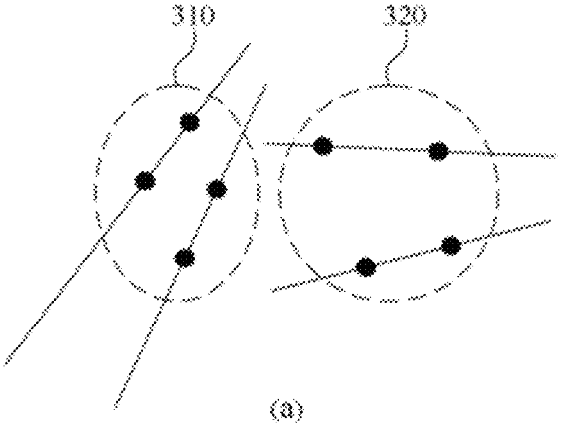
(a)
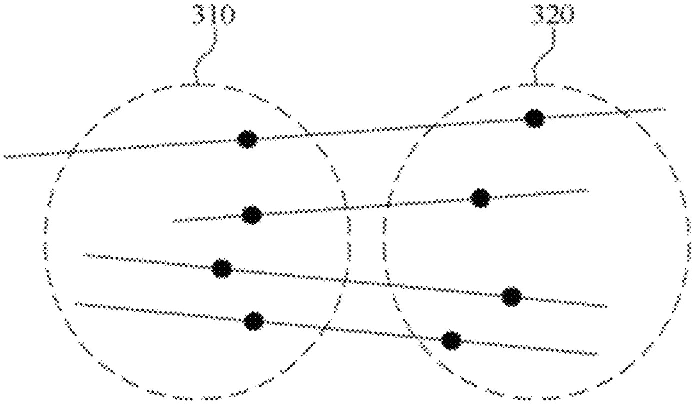
(b)

[FIG. 4]
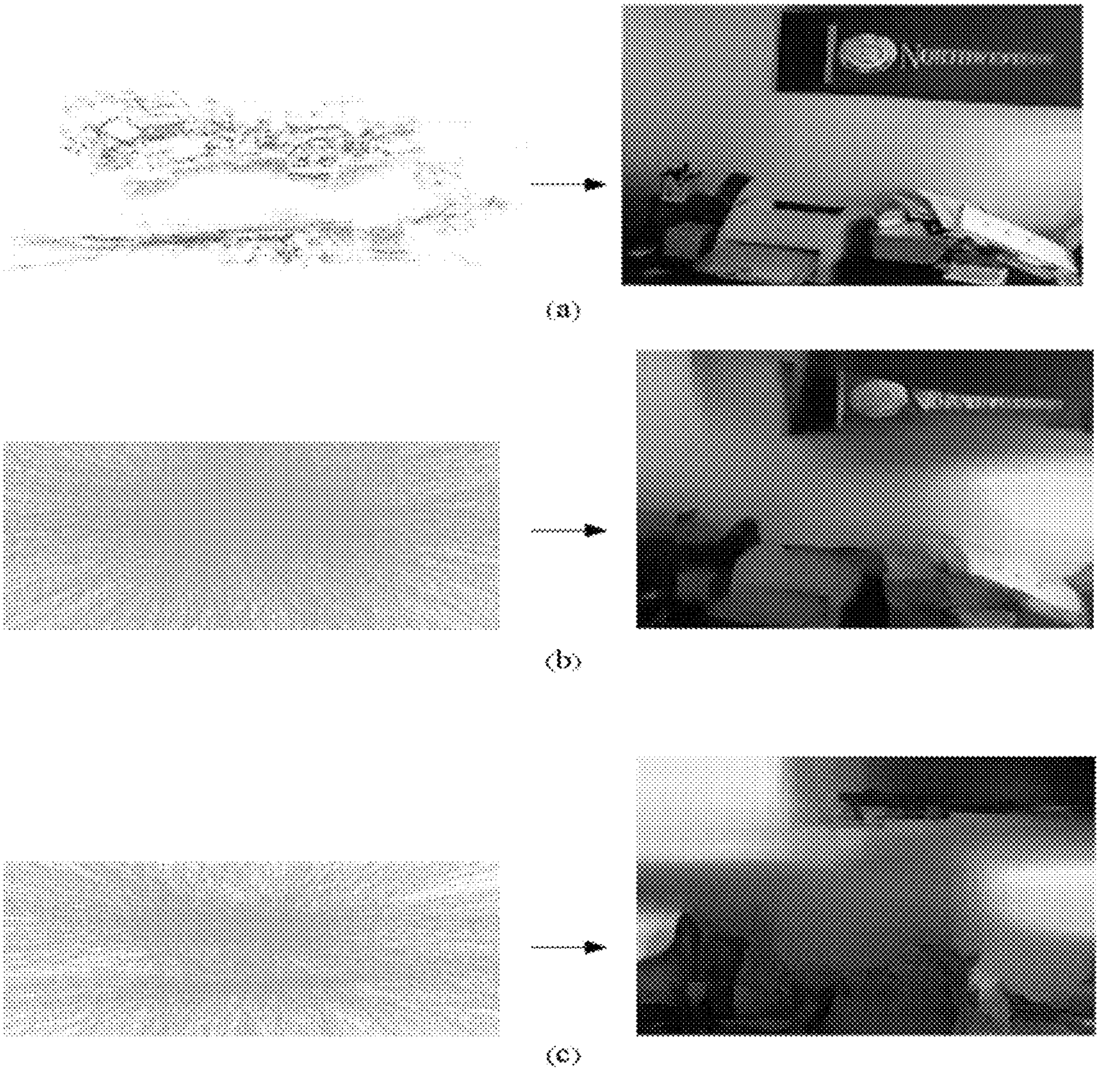

[FIG. 5]
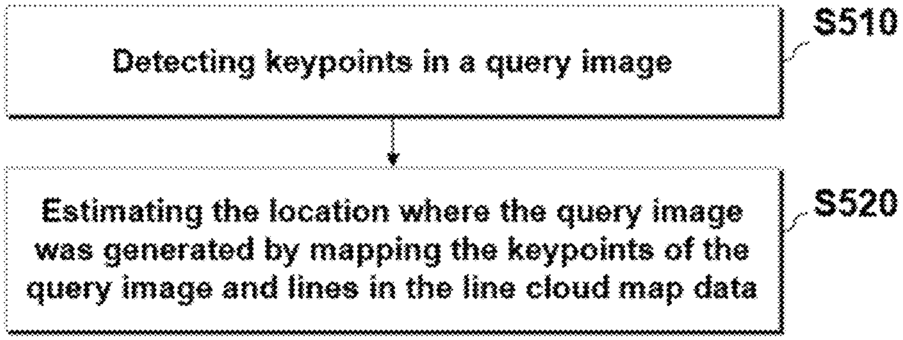

[FIG. 6]
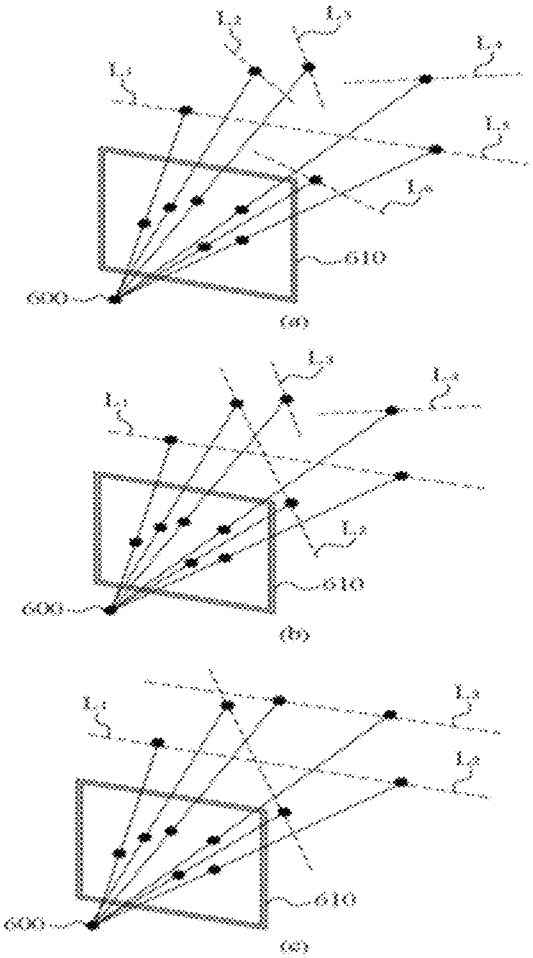

[FIG. 7]
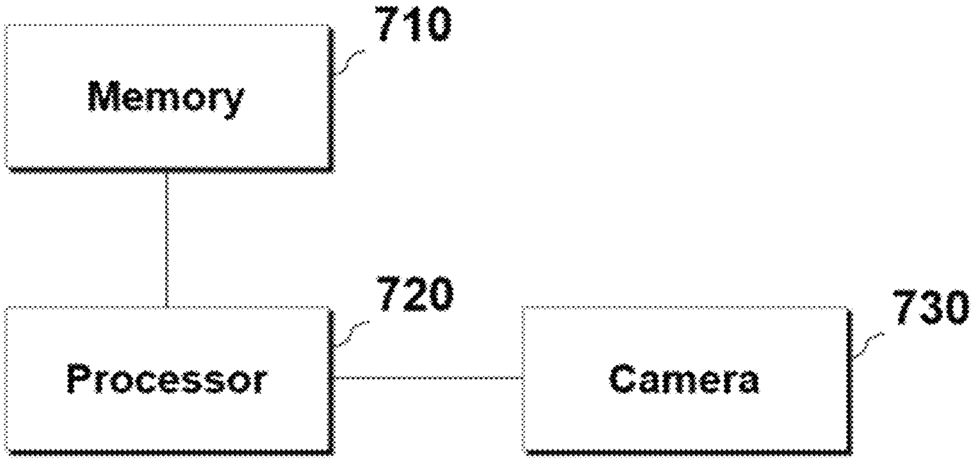

LOCALIZATION METHOD AND APPARATUS USING LINE CLOUD MAP DATA, LINE CLOUD MAP DATA GENERATION METHOD

TECHNICAL FIELD

The disclosure relates to a location estimation method and apparatus using line cloud map data and a method for generating line cloud map data, and more particularly, to a method for generating line cloud map data that can ensure privacy and a location estimation method and apparatus using the line cloud map data that can ensure privacy.

BACKGROUND

The visual localization technique is a technique of estimating the location where a query image was obtained (or photographed) by map data. The map data may consist of point cloud data, which is a set of keypoints extracted from an original image taken in a target space, and the point cloud data can be generated via the SfM (Structure-from-Motion) algorithm. By mapping the keypoints of the query image and the keypoints of the map data via the PnP (Perspective-n-Point) algorithm, the location where the query image was generated (or obtained) can be estimated. Such visual localization techniques are utilized in SLAM (Simultaneous Localization and Mapping), and the like.

Since such point cloud data includes the locations of the keypoints and feature information on the keypoints, the original image can be reconstructed from the point cloud data via an inverse reconstruction (InvSfM) algorithm. Because the original image may include people located in the target space, a privacy violation issue may arise if the point cloud data is reconstructed to the original image.

In order to resolve such a privacy violation issue, techniques for converting point cloud data into line cloud data and estimating a location from the line cloud data have recently been developed. If line cloud map data is used, the location where the query image was obtained can be estimated by mapping the keypoints of the query image and the lines in the line cloud map data via the PnL (Perspective-n-Line) algorithm.

The technique of estimating a location by using line cloud map data described above is a method of using line cloud map data generated by mapping each keypoint included in the point cloud map data to a line in a random direction in 1:1, and in this case, since the locations of the keypoints mapped to the lines can be estimated in the Kuiper method, the method described above may also pose a privacy violation issue.

Therefore, there is a need for a location estimation method that can ensure privacy more strongly.

As relevant prior art literature, there are patent documents, Korean Patent Application Publication Nos. 2021-0144404 and 2022-0138824, and Korean Patent No. 10-2198195, non-patent documents, "Privacy Preserving Image-Based Localization, Pablo Speciale et al., CVPR 2019," "Camera pose estimation based on PnL with a known vertical direction, Louis Lecrosnier et al., IEEE ROBOTICS AND AUTOMATION LETTERS. PREPRINT VERSION. JULY, 2019," etc.

SUMMARY

Technical Objects

The present disclosure is designed to provide a method for generating line cloud map data with enhanced security that can ensure privacy.

Further, the present disclosure is designed to provide a location estimation method and apparatus using line cloud map data that can ensure privacy.

Technical Solution

Effects of the Disclosure

According to one embodiment of the present disclosure, the reconstruction quality of the original image from which the keypoints were extracted can be lowered, thereby ensuring privacy.

Further, according to one embodiment of the present disclosure, the size of the map data can be reduced by generating line cloud map data using lines determined from pairs of keypoints, compared to the case of generating line cloud map data using lines determined from single keypoints.

BRIEF DESCRIPTION OF THE DRAWINGS

FIGS. 1 and 2 are diagrams for describing a method for generating line cloud map data in accordance with one embodiment of the present disclosure;

FIG. 3 is a diagram for describing a pairing method in accordance with one embodiment of the present disclosure;

FIG. 4 is a diagram for describing the effect of ensuring privacy of line cloud map data in accordance with one embodiment of the present disclosure;

FIGS. 5 and 6 are diagrams for describing a location estimation method using line cloud map data in accordance with one embodiment of the present disclosure; and FIG. 7 is a diagram for describing a location estimation apparatus using line cloud map data in accordance with one embodiment of the present disclosure.

DETAILED DESCRIPTION OF EMBODIMENTS

Since the present disclosure can be subject to a variety of modifications and have various embodiments, particular embodiments will be illustrated in the drawings and described in detail in the detailed description. However, this is not intended to limit the present disclosure to particular embodiments, and should be understood to include all modifications, equivalents, and alternatives that fall within the spirit and technical scope of the present disclosure. Like reference numerals are used for like components while describing each drawing.

As described above, since reconstruction to an original image from point cloud map data can be easily performed, privacy issues may arise in which people included in the original image may be exposed. Accordingly, the present disclosure proposes a method for generating line cloud map data with enhanced security that can ensure privacy and a location estimation method using line cloud map data that can ensure privacy.

One embodiment of the present disclosure generates line cloud map data by using lines passing through pairs of keypoints selected from keypoints included in point cloud map data. Reconstruction of the original image is performed via the locations of the keypoints included in the point cloud map data and the feature information on these keypoints, and according to one embodiment of the present disclosure, since it is difficult to estimate the location of a keypoint to which feature information is assigned, the reconstruction of the original data also becomes difficult.

The line cloud map data generated according to one embodiment of the present disclosure may be three-dimensional line cloud map data, and may be three-dimensional line cloud map data generated from three-dimensional point cloud map data.

The method for generating line cloud map data and the location estimation method using the line cloud map data in accordance with one embodiment of the present disclosure may be performed on a computing device including a memory and a processor.

Hereinafter, embodiments in accordance with the present disclosure will be described in detail with reference to the accompanying drawings.

FIGS. 1 and 2 are diagrams for describing a method for generating line cloud map data in accordance with one embodiment of the present disclosure.

Referring to FIG. 1, a computing device in accordance with one embodiment of the present disclosure receives point cloud map data as input (S110). The point cloud map data may include location information and feature information on a plurality of keypoints extracted from an image of a target space.

And the computing device pairs the keypoints included in the inputted point cloud map data into pairs of keypoints, i.e., keypoint pairs (S120). In other words, via the pairing process, keypoint pairs consisting of two keypoints are selected from the keypoints included in the point cloud map data.

For example, if the point cloud map data 210 includes 16 keypoints as shown in FIG. 2, a total of 8 keypoint pairs may be determined. Two keypoints located on one line shown in the point cloud map data 210 of FIG. 2 correspond to a keypoint pair.

The computing device generates line cloud map data by matching first feature information on the lines determined by the keypoint pairs and second feature information of the keypoint pairs (S130). In other words, the line cloud map data includes the first and second feature information, and the pieces of feature information on the lines determined by the same keypoint pair are matched to each other. For example, in FIG. 2, first feature information on a first line 211 and second feature information on two keypoints 212 and 213 located on the first line 211 may be matched to each other.

In step S130, the computing device may generate the first feature information on the lines determined by the keypoint pairs, delete the location information of the keypoints included in the point cloud map data, and then match the first feature information and the second feature information to each other, thereby generating the line cloud map data.

Here, the first feature information may include direction information of the lines determined by the keypoint pairs and location information of a reference point located on the lines. The direction information of the lines may correspond to direction vectors determined by the coordinates of two keypoints included in the keypoint pairs, and the location information of the reference point may correspond to location information on an arbitrary point on the lines.

And the second feature information is feature information on each of the keypoints included in the keypoint pairs, and may be information including not only keypoint descriptors such as SIFT, SURF, ORB, and the like, but also various types of features, such as the scale or orientation of the keypoints, and feature information generated from a deep learning model.

In addition, according to an embodiment, the computing device may further match the first and second feature information with color information on the keypoint pairs. The color information is color information on each of the keypoints included in the keypoint pairs, and may be expressed in various forms such as RGB, YUV, HSV, and Cmyk. In the example described above, the first feature information on the first line 211, the second feature information on the two keypoints 212 and 213 located on the first line 211, and color information on the two keypoints 212 and 213 may be matched to each other.

The point cloud map data includes the location information of the keypoints, whereas the line cloud map data in accordance with one embodiment of the present disclosure includes only the feature information on the lines and keypoint pairs but does not include the location information of the keypoints. Therefore, according to one embodiment of the present disclosure, the reconstruction quality of the original image is lowered, and privacy can thus be ensured.

FIG. 3 is a diagram for describing a pairing method in accordance with one embodiment of the present disclosure.

As described above, the computing device in accordance with one embodiment of the present disclosure pairs the keypoints included in the point cloud map data into keypoint pairs in step S120. Therefore, pairing requires an even number of keypoints, and if the number of keypoints included in the point cloud map data is odd, the computing device may remove an odd number of keypoints, e.g., one keypoint, out of the keypoints included in the point cloud map data in order to make the number of keypoints included in the point cloud map data an even number, and perform pairing. The number of keypoints to be removed is less than the total number of keypoints included in the point cloud map data. According to an embodiment, the keypoints included in the point cloud map data may be included in keypoint pairs more than once. In other words, one keypoint may be included in a plurality of keypoint pairs.

In addition, the computing device may perform pairing in a variety of ways according to embodiments. The computing device may randomly select keypoints included in the point cloud map data and pair them into keypoint pairs, or may cluster the keypoints included in the point cloud map data into a plurality of groups and then perform pairing. The computing device may pair keypoints included in the same group into keypoint pairs, or pair each keypoint selected from two different groups into a keypoint pair.

If the keypoints included in the point cloud map data are clustered into first and second groups 310 and 320, as shown in FIG. 3, the computing device may pair the keypoints included in the first group 310 into keypoint pairs and pair the keypoints included in the second group 320 into keypoint pairs, as shown in FIG. 3(*a*). Alternatively, one keypoint selected from the first group 310 and one keypoint selected from the second group 320 may be paired into a keypoint pair, as shown in FIG. 3(*b*). Two keypoints located on one line in FIG. 3 correspond to a keypoint pair.

Alternatively, the computing device may perform pairing again for keypoint pairs that do not satisfy preset conditions out of the keypoint pairs. As one embodiment, the computing device may determine whether the keypoints included in the keypoint pairs are located on the same plane, and perform pairing again using the keypoints included in the keypoint pairs whose keypoints have been determined to be located on the same plane. In other words, the computing device may perform pairing again to determine keypoint pairs for the keypoints that have been determined to be located on the same planes.

The computing device may perform pairing again by repetitively determining whether keypoint pairs are located on the same plane, and perform pairing by excluding the keypoints that have been determined to be located on the same plane a preset number of times. Because there is a possibility that the locations of the keypoints may be estimated if the keypoint pairs are located on the same plane, the computing device increases the number of keypoint pairs that are not located on the same plane by performing pairing again for the keypoint pairs located on the same plane.

The computing device may determine that keypoint pairs are located on the same plane if the angle between a normal vector to the plane determined by a keypoint pair and peripheral keypoints of the keypoint pair and a straight line vector to the keypoints included in the keypoint pair is within a preset angle range. And the computing device may generate a peripheral keypoint vector whose elements are the coordinates of keypoints located around one of the keypoints included in the keypoint pair, perform singular value decomposition (SVD) on the peripheral keypoint vector, and then use one of the decomposed vectors as a normal vector to the plane.

Meanwhile, when performing clustering, groups (310, 320) can be divided based on the location of feature points, and the computing device can cluster feature points based on the color domain or descriptor domain. In other words, the computing device can divide groups based on the XYZ coordinates of the feature points, divide the groups by the RGB value of the color, and feature points including similar information can be clustered by comparing the similarity of the vector values of the descriptor.

Keypoint |pairing may be performed to maximize the distance between feature descriptors and/or RGB colors. For example, distance maximization can be performed using a greedy algorithm (selecting pairs with largest distance), graph based optimization algorithm and neural network based graph algorithm.

FIG. 4 is a diagram for describing the effect of ensuring privacy of line cloud map data in accordance with one embodiment of the present disclosure, and in FIG. 4, the left images show map data and the right images show reconstructed images.

FIG. 4(*a*) shows point cloud map data for a target space and an image of the target space reconstructed from the point cloud map data. And FIG. 4(*b*) shows line cloud map data generated using single keypoints out of the keypoints included in the point cloud map data of FIG. 4(*a*) and an image of the target space reconstructed from the line cloud map data. Lastly, FIG. 4(*c*) shows line cloud map data generated in accordance with one embodiment of the present disclosure by using pairs of keypoints out of the keypoints included in the point cloud map data of FIG. 4(*a*), and an image of the target space reconstructed from the line cloud map data.

As shown in FIG. 4, it can be seen that according to one embodiment of the present disclosure, the reconstruction quality of the original image is the lowest. This is because the line cloud map data does not include the location information of the keypoints and it is thus difficult to accurately estimate the locations of the keypoints, as described above. In particular, in the case of the method used in FIG. 4(*b*), since one keypoint is matched to one line, estimated keypoints and feature information can also be easily matched if the locations of the keypoints are estimated somewhat accurately, and thus, a reconstructed image can be generated similarly to the original image. However, in one embodiment of the present disclosure, since a pair of, i.e., two, keypoints are matched to one line, it is difficult to accurately match the two keypoints with the feature information of the two keypoints even if the locations of the keypoints are accurately estimated, and therefore, the reconstruction quality of the original image is inevitably lowered.

In addition, according to one embodiment of the present disclosure, the number of lines included in the line cloud map data is reduced by half compared to FIG. 4(*b*), and thus, data storage costs can be reduced.

FIGS. 5 and 6 are diagrams for describing a location estimation method using line cloud map data in accordance with one embodiment of the present disclosure.

Referring to FIG. 5, a computing device in accordance with one embodiment of the present disclosure detects keypoints in a query image (S510), maps the keypoints of the query image and lines in line cloud map data, and estimates the location where the query image was obtained (S520). Here, the line cloud map data is data generated according to the method described above, and includes first feature information on lines determined from keypoint pairs, i.e., pairs of keypoints selected from keypoints included in the point cloud map data. And it includes second feature information on the keypoint pairs that are matched to the lines determined from the keypoint pairs. In other words, the first and second feature information on the same lines is included in the point cloud map data in a matched form.

The first feature information may include direction information of the lines determined from the keypoint pairs and location information on a reference point located on the lines determined from the keypoint pairs, and the line cloud map data may further include color information on the keypoint pairs that are matched to the lines determined from the keypoint pairs. In other words, the first and second feature information and the color information on the same lines is included in the line cloud map data in a matched form.

In step S520, the computing device may estimate the location where the query image was obtained using the P6L algorithm, as one embodiment. In other words, the location where the query image was obtained can be estimated by mapping six keypoints detected in the query image to the lines in the line cloud map data. The computing device may map the keypoints of the query image and the lines in the line cloud map data by using the similarity between the feature information of the keypoints detected in the query image and the feature information on the keypoints matched to the lines in the line cloud map data.

FIG. 6 is a diagram showing various examples in which keypoints of a query image 610 and lines are mapped according to the similarity of feature information, and since feature information on a pair of, i.e., two, keypoints is matched to a line in the line cloud map data, the number of lines in the line cloud map data mapped to each of the keypoints of the query image 610 may be one or two. FIG. 6(*a*) shows an example in which six keypoints of the query image 610 are mapped to six lines $L_1$ to $L_6$, respectively, and FIG. 6(*b*) shows an example in which two keypoints of the query image 610 are mapped to the first line $L_1$. FIG. 6(*c*) shows an example in which two keypoints of the query image 610 are mapped to each of the first to third lines $L_1$ to $L_3$. The points located on the lines $L_1$ to $L_6$ in FIG. 6 represent all or part of pairs of keypoints.

By having the keypoints of the query image 610 and the lines matched as in FIG. 6, the location 600 where the query image was obtained can be estimated.

FIG. 7 is a diagram for describing a location estimation apparatus using line cloud map data in accordance with one embodiment of the present disclosure.

Referring to FIG. 7, the location estimation apparatus in accordance with one embodiment of the present disclosure includes a memory 710, at least one processor 720, and a camera 730.

The camera 730 generates a query image. The camera 730 may generate a query image by photographing an object located in front thereof at the current location.

The processor 720 electrically connected to the memory 710 detects keypoints in the query image, maps the detected keypoints of the query image to lines in line cloud map data, and estimates the location where the query image was obtained. The line cloud map data includes first feature information on lines determined from keypoint pairs included in the point cloud map data, and second feature information on pairs of keypoints matched to the lines determined from the keypoint pairs.

The technical contents described above may be implemented in the form of program instructions that can be executed via a variety of computer means and recorded on a computer-readable medium. The computer-readable medium may include program instructions, data files, data structures, and the like, alone or in combination. The program instructions recorded on the medium may be those that are specially designed and configured for the embodiments or those that are known and available to persons skilled in the art of computer software. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program instructions, such as ROM, RAM, flash memory, etc. Examples of program instructions include not only machine language code, such as those produced by a compiler, but also high-level language code that can be executed by a computer using an interpreter or the like. A hardware device may be configured to operate as one or more software modules, and vice versa, to perform the operations of the embodiments.

As described above, the present disclosure has been described by means of particular details such as specific components and the like and limited embodiments and drawings, but this is merely provided to help with a more general understanding of the present disclosure, the present disclosure is not limited to the embodiments described above, and various modifications and variations can be made from these descriptions by those having ordinary skill in the art to which the present disclosure pertains. Therefore, the spirit of the present disclosure should not be limited to the described embodiments, and not only the patent claims described below but also all things that are equivalent to the claims or have equivalent variations fall within the scope of the spirit of the present disclosure.

What is claimed:

1. A method of estimating a location using line cloud map data, comprising:
- detecting keypoints in a query image; and
- estimating a location where the query image was obtained by mapping the keypoints of the query image and lines in line cloud map data,
- wherein the line cloud map data comprise first feature information on lines determined by keypoint pairs selected from keypoints included in point cloud map data, and second feature information on the keypoint pairs matched to the determined lines,
- wherein the keypoint pairs are paired by randomly selecting the keypoints included in the point cloud map data.

2. The method of claim 1, wherein the first feature information comprises direction information of the lines and location information on a reference point located on the lines.

3. The method of claim 1, wherein the second feature information comprises keypoint descriptors or a scale or orientation of the keypoints,
- the line cloud map data further comprises color information on the keypoint pairs matched to the lines.

4. The method of claim 1, wherein the number of the lines in the line cloud map data mapped to each of the keypoints of the query image is one or two.

5. The method of claim 1, wherein the line cloud map data is data comprising keypoints extracted from an image photographed in a target space.

6. An apparatus for estimating a location using line cloud map data, comprising:
- a memory;
- at least one processor electrically connected to the memory; and
- a camera configured to generate a query image,
- wherein the process:
- detects keypoints in the query image, and
- estimates a location where the query image was obtained by mapping the keypoints of the query image and lines in line cloud map data, and
- wherein the line cloud map data comprise first feature information on lines determined by keypoint pairs selected from keypoints included in point cloud map data, and second feature information on the keypoint pairs matched to the determined lines,
- wherein the keypoint pairs are paired by randomly selecting the keypoints included in the point cloud map data.

7. A method of generating line cloud map data, comprising:
- receiving point cloud map data as input;
- pairing keypoints included in the point cloud map data into keypoint pairs; and
- matching first feature information on lines determined by the keypoint pairs and second feature information of the keypoint pairs,
- wherein the pairing the keypoints into the keypoint pairs randomly selects and pairs the keypoints included in the point cloud map data into the keypoint pairs.

8. The method of claim 7, wherein the first feature information comprises direction information of the lines and location information of a reference point located on the lines.

9. The method of claim 7, wherein the matching the second feature information of the keypoint pairs matches the first and second feature information such as keypoint descriptors or a scale or orientation of the keypoints, and color information on the keypoint pairs.

10. The method of claim 7, wherein the pairing the keypoints into the keypoint pairs removes an odd number of keypoints out of the keypoints included in the point cloud map data if the number of the keypoints included in the point cloud map data is an odd number.

11. The method of claim 7, wherein the pairing the keypoints into the keypoint pairs comprises:
- clustering the keypoints included in the point cloud map data into a plurality of groups; and
- pairing keypoints included in the same group into the keypoint pairs.

12. The method of claim 7, wherein the pairing the keypoints into the keypoint pairs comprises:

clustering the keypoints included in the point cloud map data into a plurality of groups; and pairing each keypoint selected from two different groups into the keypoint pairs.

13. The method of claim 7, wherein the pairing the keypoints into the keypoint pairs comprises:

determining whether the keypoints included in the keypoint pairs are located on the same plane; and performing pairing again using keypoints included in keypoint pairs in which the keypoints have been determined to be located on the same plane.

14. The method of claim 13, wherein the pairing the keypoints into the keypoint pairs performs the pairing by excluding keypoints that have been determined to be located on the same plane a preset number of times.

* * * * *